US008948406B2

(12) United States Patent
Lee et al.

(10) Patent No.: US 8,948,406 B2
(45) Date of Patent: Feb. 3, 2015

(54) SIGNAL PROCESSING METHOD, ENCODING APPARATUS USING THE SIGNAL PROCESSING METHOD, DECODING APPARATUS USING THE SIGNAL PROCESSING METHOD, AND INFORMATION STORAGE MEDIUM

(75) Inventors: Nam-suk Lee, Suwon-si (KR); Han-gil Moon, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 632 days.

(21) Appl. No.: 13/204,120

(22) Filed: Aug. 5, 2011

(65) Prior Publication Data

US 2012/0033816 A1 Feb. 9, 2012

Related U.S. Application Data

(60) Provisional application No. 61/371,294, filed on Aug. 6, 2010.

(30) Foreign Application Priority Data

Jul. 13, 2011 (KR) ........................ 10-2011-0069498

(51) Int. Cl.

| | |
|---|---|
| ***H04R 5/00*** | (2006.01) |
| ***G06F 17/00*** | (2006.01) |
| ***G10L 19/008*** | (2013.01) |
| *H04S 3/00* | (2006.01) |

(52) U.S. Cl.

CPC ............... *G10L 19/008* (2013.01); *H04S 3/008* (2013.01); *H04S 2400/03* (2013.01); *H04S 2420/03* (2013.01)

USPC .................................. 381/22; 381/23; 700/94

(58) Field of Classification Search

USPC .................. 381/1, 17–23, 27, 30, 34; 700/94; 704/500, 501, 503, 504; 375/E7.187

See application file for complete search history.

(56) References Cited

U.S. PATENT DOCUMENTS

2005/0276420 A1* 12/2005 Davis ............................. 381/20
2007/0040934 A1* 2/2007 Ramaswamy et al. ..... 348/385.1

(Continued)

FOREIGN PATENT DOCUMENTS

KR 2000-0014812 A 3/2000
KR 10-2007-0003593 A 1/2007

OTHER PUBLICATIONS

"Digital Audio Compression Standard (AC-3, E-AC-3) Revision B"; Jun. 14, 2005; Advanced Television Systems Commitee, Inc.; pp. 1, 28,140, 141, and 211-214.*

(Continued)

*Primary Examiner* — Vivian Chin
*Assistant Examiner* — David Ton
(74) *Attorney, Agent, or Firm* — Sughrue Mion, PLLC

(57) ABSTRACT

Provided is a signal processing method for processing a bitstream, an information storage medium including the bitstream, an encoding apparatus, and a decoding apparatus. The signal processing method includes: receiving a bitstream including additional information; extracting first information which is information associated with extraction of the additional information and is included in at least one of additional bitstream information, a skip field, and auxiliary data bits, which are included in the bitstream; and extracting and decoding the additional information by using the first information.

28 Claims, 11 Drawing Sheets

(56) References Cited

U.S. PATENT DOCUMENTS

| | | | | |
|---|---|---|---|---|
| 2009/0063159 A1* | 3/2009 | Crockett | ...................... | 704/500 |
| 2012/0237039 A1* | 9/2012 | Thesing et al. | ................. | 381/22 |
| 2012/0243692 A1* | 9/2012 | Ramamoorthy | ................ | 381/22 |

OTHER PUBLICATIONS

European Telecommunications Standards Institute, "Digital Audio Compression (AC-3, Enhanced AC-3) Standard", V1.2.1, Aug. 2008.*

* cited by examiner

SIGNAL PROCESSING METHOD, ENCODING APPARATUS USING THE SIGNAL PROCESSING METHOD, DECODING APPARATUS USING THE SIGNAL PROCESSING METHOD, AND INFORMATION STORAGE MEDIUM

CROSS-REFERENCE TO RELATED PATENT APPLICATIONS

This application claims the benefit of U.S. Provisional Application No. 61/371,294, filed on Aug. 6, 2010, and claims priority from Korean Patent Application No. 10-2011-0069498, filed on Jul. 13, 2011 in the Korean Intellectual Property Office, the disclosures of which are incorporated herein in their entireties by reference.

BACKGROUND

1. Field

Apparatuses and methods consistent with exemplary embodiments relate to a signal processing method, an encoding apparatus using the signal processing method, a decoding apparatus using the signal processing method, and an information storage medium, and more particularly, to a signal processing method for inserting additional information into or extracting additional information from a bitstream, an encoding apparatus using the signal processing method, a decoding apparatus using the signal processing method, and an information storage medium.

2. Description of the Related Art

To compress and transmit an audio signal, and receive the compressed audio signal and decompress the compressed audio signal into the original audio signal, a transmitting side uses an encoder and a receiving side uses a decoder. The transmitting side and the receiving side compress and decompress an audio signal according to a predetermined standard.

As one of standards for transmitting audio signals, there is Audio Coding (AC)-3. The AC-3 refers to a third form of audio coding schemes developed by US Dolby Laboratories, Inc., and is a standard for an audio part of digital video discs (DVDs). The AC-3 uses 5.1 channels to produce a sound. More specifically, the AC-3 uses 5.1 channels which separate and output audio signals through 6 speakers including 5 speakers installed in Left, Right, Center, Left Surround, and Right Surround positions and a subwoofer speaker for a low-frequency effect.

Recently, to implement a more stereoscopic audio system, a method and apparatus for generating an audio signal by expanding the number of audio channels more than 5.1 channels has been developed. For example, an audio system having 10.2 channels capable of outputting separated audio signals through 12 speakers has been developed.

The AC-3 standard limits the number of compressible audio channels to a maximum of 5+1=6. As a result, the AC-3 may generate and transmit only a bitstream through 5.1 channels, and when the number of audio channels exceeds 6, a bitstream cannot be generated and transmitted.

The Enhanced AC-3 standard, which is an improvement of the AC-3 standard, limits the number of compressible audio channels to a maximum of 13.1. Therefore, for more than 13.1 channels, a bitstream cannot be generated and transmitted according to the Enhanced AC-3 standard.

Accordingly, a method and apparatus for extending a function provided by a stream while complying with the AC-3 or Enhanced AC-3 standard has been developed, and there is a need for a signal processing method and apparatus capable of providing various functions.

SUMMARY

One or more exemplary embodiments provide a signal processing method capable of inserting additional information into a bitstream while complying with the AC-3 or Enhanced AC-3 standard, an encoding apparatus using the signal processing method, a decoding apparatus using the signal processing method, and an information storage medium.

One or more exemplary embodiments also provide a signal processing method capable of rapidly and easily extracting additional information from a bitstream, an encoding apparatus using the signal processing method, a decoding apparatus using the signal processing method, and an information storage medium.

One or more exemplary embodiments also provide a signal processing method capable of increasing a stereoscopic effect of an audio signal by using additional information while complying with the AC-3 or Enhanced AC-3 standard, an encoding apparatus using the signal processing method, a decoding apparatus using the signal processing method, and an information storage medium.

According to an aspect of an exemplary embodiment, there is provided a method for processing a bitstream including synchronization information, bitstream information, at least one audio block, and an auxiliary data field, the method including: receiving a bitstream including additional information in at least one of additional bitstream information included in the bitstream information, a skip field included in the at least one audio block, and auxiliary data bits included in the auxiliary data field; extracting first information, which is information associated with extraction of the additional information, the first information being included in at least one of the additional bitstream information, the skip field, and the auxiliary data bits; and extracting and decoding the additional information by using the first information.

The additional information may include at least one of reconstruction information of multi-channels for expanding a channel number to the number of channels included in the bitstream or more, and three-dimensional (3D) information of at least one audio signal.

The first information may include at least one of information indicating whether the additional information is included, position information of the additional information, and length information of the additional information.

The extracting of the first information may include detecting the synchronization information, reading the bitstream in a backward direction with respect to the detected synchronization information, and extracting the first information included in the auxiliary data bits.

The extracting of the first information may include detecting the synchronization information, reading the bitstream in a forward direction with respect to the detected synchronization information, and extracting the first information included in the additional bitstream information.

The extracting of the first information may include extracting an identifier indicating a point in the bitstream at which the additional information is inserted as the first information.

The 3D information of the audio signal may include at least one of 3D information corresponding to each of the channels included in the bitstream and reconstruction information of the 3D information for generating the 3D information to fit the number of expanded channels.

The 3D information corresponding to each of the channels may include at least one of a depth map of video data, a plurality of depth values mapped to the audio signal, and depth value reconstruction information for generating the plurality of depth values mapped to the audio signal.

The method may further include, at an encoding apparatus, generating the additional information, encoding the at least one audio signal according to a predetermined standard, formatting the encoded audio signal to the bitstream, inserting the additional information into at least one of the additional bitstream information, the skip field, and the auxiliary data bits, and inserting the first information into at least one of the additional bitstream information, the skip field, and the auxiliary data bits.

The method may further include transmitting the bitstream into which the additional information and the first information are inserted to a decoding apparatus.

According to an aspect of another exemplary embodiment, there is provided an information storage medium for storing a bitstream including at least one audio signal, wherein the bitstream includes synchronization information, bitstream information including additional bitstream information, at least one audio block including a skip field, and an auxiliary data field including auxiliary data bits, and at least one of the additional bitstream information, the skip field, and the auxiliary data bits includes additional information for executing at least one of channel number expansion and three-dimensional (3D) reproduction of the audio signal, and at least one of the additional bitstream information, the skip field, and the auxiliary data bits includes first information which is information associated with extraction of the additional information.

According to an aspect of another exemplary embodiment, there is provided an encoding apparatus including: an encoder which encodes at least one audio signal according to a predetermined standard; a formatter which formats the encoded at least one audio signal into a bitstream including synchronization information, bitstream information, at least one audio block, and an auxiliary data field; and a control unit which inserts additional information into at least one of additional bitstream information included in the bitstream information, a skip field included in the at least one audio block, and auxiliary data bits included in the auxiliary data field, and which inserts first information, which is information associated with extraction of the additional information, into at least one of the additional bitstream information, the skip field, and the auxiliary data bits.

According to an aspect of another exemplary embodiment, there is provided a decoding apparatus including: a deformatter which deformats a bitstream including synchronization information, bitstream information, at least one audio block, and an auxiliary data field; a control unit which extracts first information, which is information associated with extraction of the additional information and included in at least one of additional bitstream information included in the bitstream information, a skip field included in the at least one audio block, and auxiliary data bits included in the auxiliary data field, and which extracts the additional information from at least one of the additional bitstream information, the skip field, and the auxiliary data bits by using the extracted first information; and a decoder which decodes the extracted additional information.

According to an aspect of another exemplary embodiment, there is provided a method of processing a bitstream, the method including: generating additional information; encoding at least one audio signal according to a predetermined standard; formatting the encoded at least one audio signal to the bitstream, the bitstream comprising bitstream information, at least one audio block, and an auxiliary data field; inserting the additional information into at least one of additional bitstream information included in bitstream information, a skip field included in the at least one audio block, and auxiliary data bits included in the auxiliary data field; and inserting first information into at least one of the additional bitstream information, the skip field, and the auxiliary data bits, wherein the first information is information used to extract the additional information from the bitstream.

BRIEF DESCRIPTION OF THE DRAWINGS

The above and other features and advantages will become more apparent by describing in detail exemplary embodiments with reference to the attached drawings in which.

DETAILED DESCRIPTION OF EXEMPLARY EMBODIMENTS

According to one or more exemplary embodiments, to extend a function (i.e., operation) provided by a bitstream complying with an AC-3 or Enhanced AC-3 standard, additional information is used. More specifically, the additional information allows a bitstream complying with the AC-3 standard to increase the number of channels to a number greater than the number of channels included in the bitstream. The additional information also allows an audio signal corresponding to each channel included in the AC-3 bitstream to be reproduced with two or more depth values. For example, the AC-3 standard limits the number of audio channels included in the bitstream to 5.1 channels, namely total 5+1=6 channels.

Referring to the accompanying drawings, a detailed description will now be provided of a signal processing method according to exemplary embodiments, which is capable of inserting or extracting additional information while complying with the AC-3 or Enhanced AC-3 standard, an encoding apparatus using the signal processing method, a decoding apparatus using the signal processing method, and an information storage medium. Hereinafter, expressions such as "at least one of," when preceding a list of elements, modify the entire list of elements and do not modify the individual elements of the list.

Figure 1:
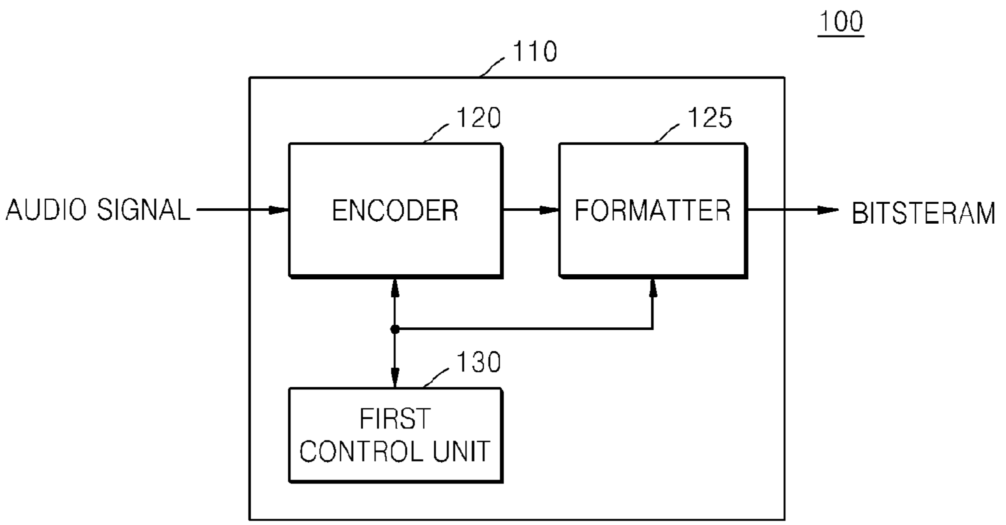
FIG. 1 is a block diagram of an encoding apparatus according to an exemplary embodiment.

FIG. 1 is a block diagram of an encoding apparatus 100 according to an exemplary embodiment. Referring to FIG. 1, an encoding apparatus 100 receives at least one audio signal corresponding to at least one channel and compresses the received at least one audio signal according to a predetermined standard to generate and output a bitstream. Herein, the predetermined standard may be a standard for processing audio signals, such as the AC-3 standard or the Enhanced AC-3 standard, though it is understood that other exemplary embodiments are not limited thereto. The following description will be made based on an example of the encoding apparatus 100 operating according to the AC-3 standard.

More specifically, the encoding apparatus 100 performs AC-3 encoding and transmits the encoded bitstream to a decoding apparatus (not shown).

The encoding apparatus 100 includes an encoder 120, a formatter 125, and a first control unit 130. The encoding apparatus 100 complying with the AC-3 standard outputs a bitstream having a channel number limited to 5.1 channels.

The encoder 120 receives the at least one audio signal corresponding to the at least one channel, and encodes the received at least one audio signal according to the predetermined standard under control of the first control unit 130.

For example, signals received by, or input to, the encoder 120 may be audio signals corresponding to 10.2 channels. The encoder 120 compresses the input 10+2=12 audio signals to audio signals including a maximum of 5.1 channels according to the AC-3 standard. That is, in this case, the encoder 120 down-mixes the input audio signals including the 10.2 channels to generate and output audio signals including the 5.1 channels.

The formatter 125, under control of the first control unit 130, formats the encoded audio signals into a bitstream including bitstream information BSI, at least one audio block AB, and an auxiliary data field AUX, and outputs the formatted bitstream which will be described in more detail with reference to FIGS. 7 through 9.

The first control unit 130 controls additional information to be inserted into at least one of additional bit stream information (addbsi) included in the bitstream information BSI, a skip field (skipfld) included in the audio blocks AB, and auxiliary data bits (Auxbits) included in the auxiliary data field AUX.

Herein, the additional information is data for extending a function (i.e., operation) provided by a bitstream complying with a predetermined standard. More specifically, the additional information may include at least one of reconstruction information of multi-channels for expanding the number of channels to the number of audio channels included in the bitstream or more, and 3D information of an audio signal.

For example, since the AC-3 bitstream may support up to the 5.1 channels, the additional information may be reconstruction information used for expanding the number of channels to 7 or more. The reconstruction information for channel expansion will be later described in detail with reference to FIG. 3. The additional information may also include depth information per sound source to three-dimensionally reproduce each of the at least one audio signal corresponding to the at least one channel. Herein, a sound source refers to an object capable of producing a sound, e.g., a musical instrument or a person who generates a voice. The additional information will be described later in detail with reference to FIGS. 3 through 6.

The first control unit 130 controls first information, which is associated with extraction of the additional information, to be inserted into at least one of the additional bitstream information (addbsi), the skip field (skipfld), and the auxiliary data bits (Auxbits).

More specifically, the first information may include at least one of information indicating whether the additional information is included, position information of the additional information, and length information of the additional information. For example, the position information of the additional information may include at least one of a start address and an end address of a region into which the additional information is inserted. If the decoding apparatus (not shown) knows, for example, the start address of the additional information and the length information of the additional information, the decoding apparatus may easily extract the additional information.

The first information may further include information indicating a type of the additional information. For instance, the first information may include a flag '00' for the additional information related to expanded channels, a flag '01' for the additional information related to 3D information, and a flag '11' for the additional information related to expanded channels and 3D information. Herein, the expanded channels refer to channels exceeding the number of channels permitted by the predetermined standard.

The first control unit 130 controls overall operations of the encoder 120 and the formatter 125 to allow the encoding apparatus 100 to encode and format audio signals and thus, output a bitstream.

The first control unit 130 may also control the bitstream generated in the formatter 125 to be transmitted to the decoding apparatus (not shown).

The detailed operations of the encoding apparatus 100 are the same as or similar to those of the signal processing method according to an exemplary embodiment, and thus will be described in detail with reference to FIGS. 2 through 9.

Figure 2:
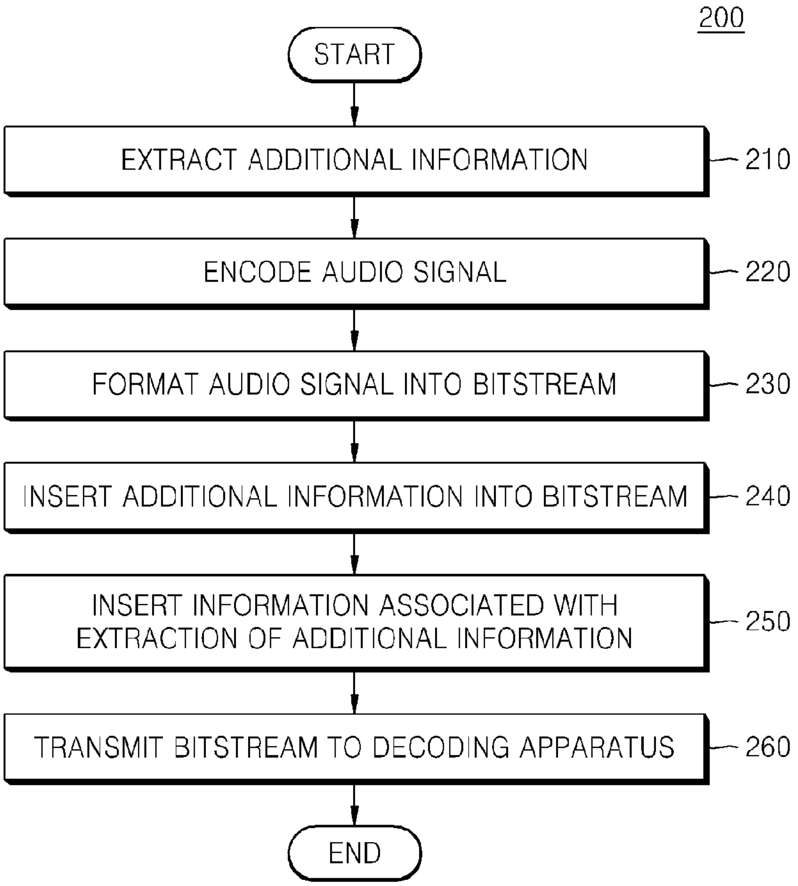
FIG. 2 is a flowchart illustrating a signal processing method according to an exemplary embodiment.

FIG. 2 is a flowchart illustrating a signal processing method 200 according to an exemplary embodiment. Operations of the signal processing method shown in FIG. 2 may be performed by the encoding apparatus 100 described with reference to FIG. 1.

Referring to FIG. 2, a signal processing method 200 includes an operation 210 of extracting or generating additional information. Operation 210 may be performed by at least one of the first control unit 130 and the encoder 120 of the encoding apparatus 100. Herein, the additional information may be input directly to the encoding apparatus 100 from an external device, and thus the first control unit 130 may extract the input additional information. The additional information may also be generated at the request of a user or generated in the encoding apparatus 100 by itself.

As mentioned previously, the additional information may include at least one of reconstruction information of multi-channels and 3D information of an audio signal. Additional information including the reconstruction information of the multi-channels will be described below with reference to FIGS. 3A and 3B, and additional information including the 3D information of the audio signal will be described later with reference to FIGS. 4 through 6.

Figure 3A:
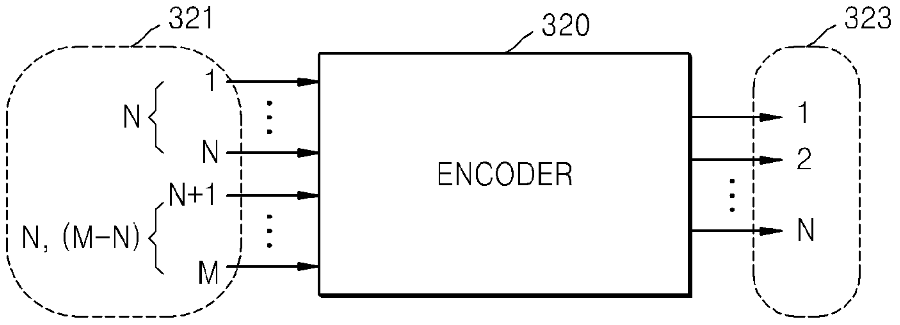
FIGS. 3A and 3B are diagrams for describing additional information for expanding the number of channels according to one or more exemplary embodiments.
Figure 3B:
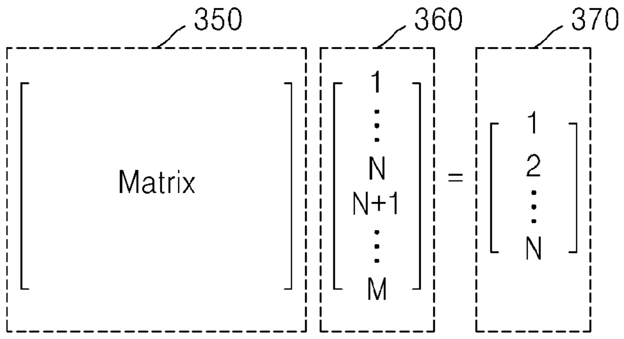

FIGS. 3A and 3B are diagrams for describing additional information for channel number expansion according to one or more exemplary embodiments. FIG. 3A is a diagram illustrating an encoder which performs a down-mixing operation. FIG. 3B is a diagram illustrating a down-mixing matrix for the down-mixing operation.

Referring to FIG. 3A, when a maximum number of channels allowed according to a predetermined standard is N, an encoder 320 down-mixes a total of M input audio signals to N audio signals. Herein, N<M. Thus, audio signals corresponding to (N+1) channels through M channels, which exceed N, cannot be included in a bitstream output from the encoding apparatus 100.

Referring to FIG. 3B, the encoder 320, during a down-mixing operation, applies a predetermined transformation equation or a transformation matrix to input audio signals 360, thus outputting encoded audio signals 370. In FIG. 3B, for example, a down-mixing matrix 350 is used as the predetermined transformation equation or the transformation matrix. In FIGS. 3A and 3B, the additional information for channel number expansion is information for reconstructing the audio signals 370 encoded to have N channels to audio signals having M channels.

For instance, to decode a bitstream including N channels and generate audio signals including M channels, a decoding apparatus applies an inverse down-mixing matrix to the encoded audio signals 370. To reconstruct, i.e., up-mix the bitstream into the audio signals corresponding to the M channels, information regarding the inverse down-mixing matrix is used.

Therefore, the additional information for expanding channel number may include parameter information used to up-mix the down-mixed audio signals. The parameter information may include at least one of a parameter indicating signal level correlation between an input signal and an output signal, a parameter indicating a phase correlation between the input signal and the output signal, and correlation information between the input signal and the output signal.

More specifically, the parameter information may be the down-mixing matrix 350 itself, each parameter value included in the down-mixing matrix 350, or the inverse down-mixing matrix. The detailed parameter information may vary with product specifications of an encoding apparatus, a down-mixing method, and so forth, and thus will not be described in detail.

The additional information for channel number expansion may further include channel information regarding expanded audio channels, a down-mixing method for down-mixing an input audio signal to adjusting a channel number defined by a predetermined standard, and the like.

Figure 4:
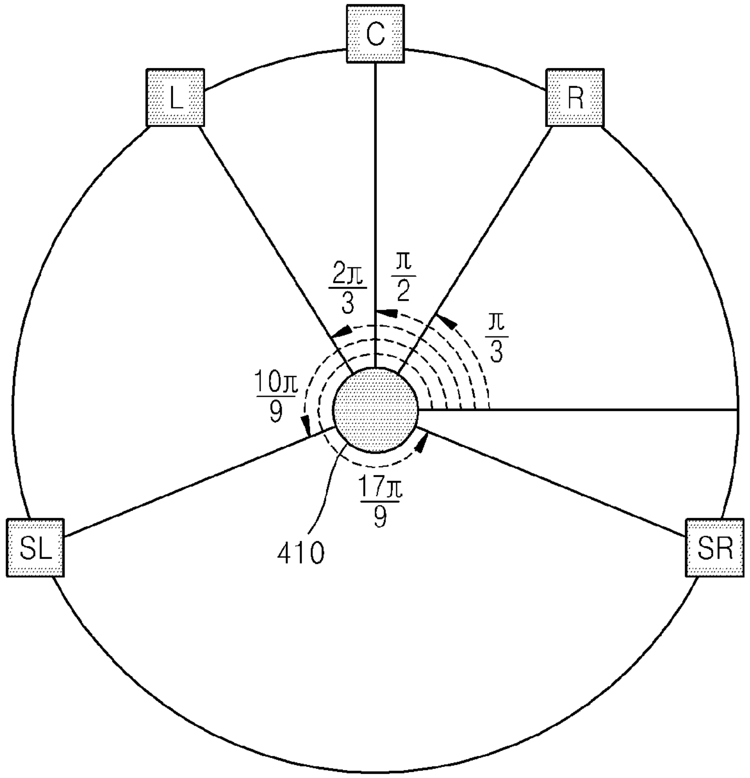
FIG. 4 is a diagram for describing audio signals corresponding to 5.1 channels.

FIG. 4 is a diagram for describing audio signals corresponding to 5.1 channels.

The AC-3 standard defines a bitstream including a maximum of 5.1 channels. In FIG. 4, audio signals corresponding to 5.1 channels may be output through 6 speakers while having predetermined depths. In FIG. 4, an audio signal having only one depth, i.e., a two-dimensional (2D) audio signal, is shown. The audio signals corresponding to the 5.1 channels may be output with an arrangement shown in FIG. 4. Alternately, the audio signals may be output with other arrangements than that shown in FIG. 4.

Referring to FIG. 4, respective audio signals L, R, C, SL, and SR are output through 5 speakers installed in Left and Right positions in a front layer, a Center position in the front layer, and Left Surround and Right Surround positions in a rear layer, respectively. A low-frequency audio signal (not shown) is output through a subwoofer speaker of a low-frequency effect. The audio signals corresponding to the 5.1 channels are output equidistantly from a sweet spot 410.

The AC-3 standard merely generates audio signals having the same depth, and does not support audio signals having different depths. Therefore, according to an exemplary embodiment, the additional information may include the 3D information of the audio signal, such that the audio signal may be three-dimensionally reproduced.

Figure 5:
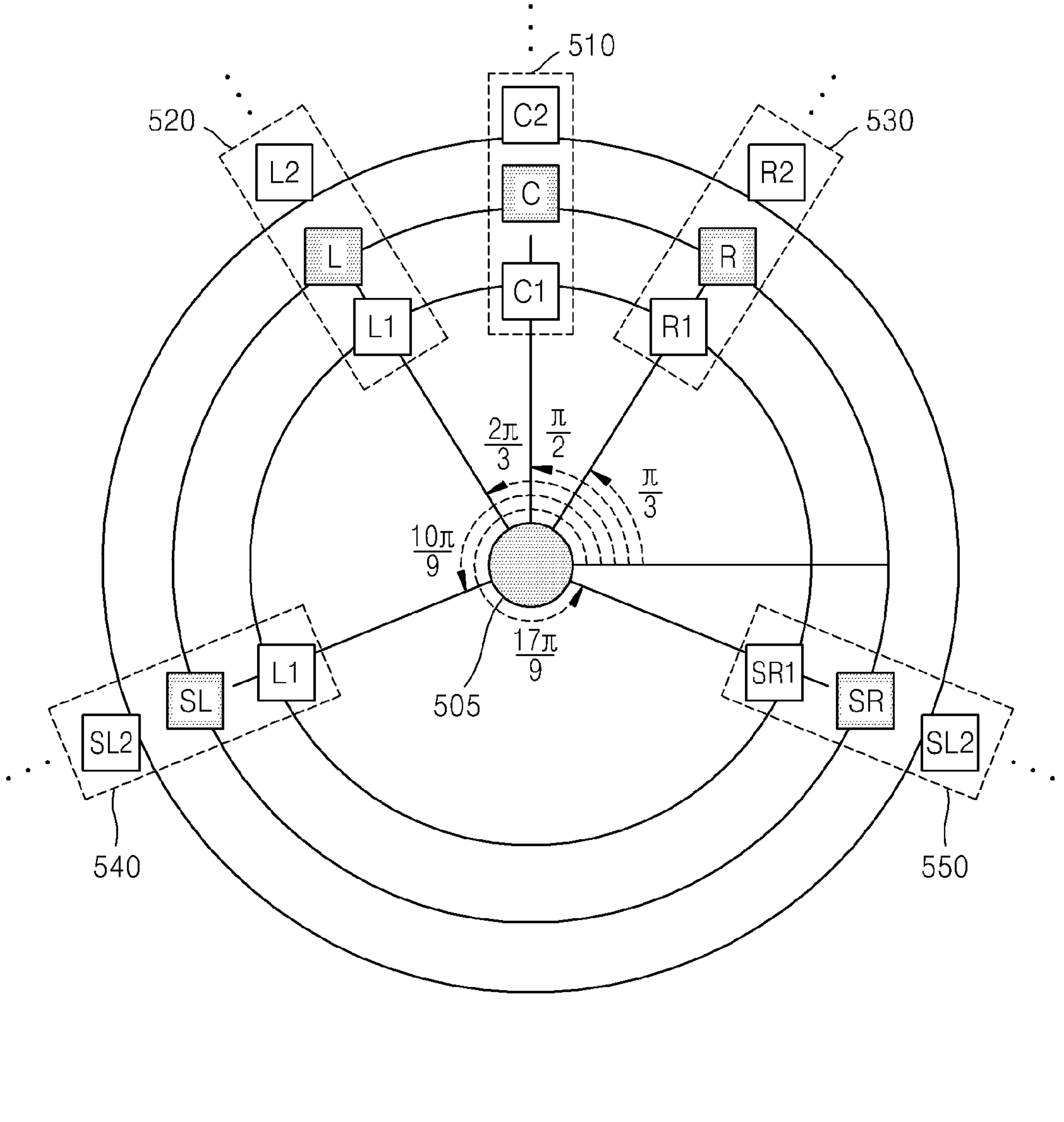
FIG. 5 is a diagram for describing additional information for 3D reproduction of audio signals according to an exemplary embodiment.

FIG. 5 is a diagram for describing additional information for 3D reproduction of audio signals according to an exemplary embodiment.

Referring to FIG. 5, for 3D reproduction of audio signals, respective audio signals L, R, C, SL, and SR may be output with a plurality of depth values 510, 520, 530, 540, and 550 from a sweet spot 505. The additional information may include the 3D information of the audio signal. More specifically, information ('3D information of audio signal') for generating a plurality of depth values (e.g., C2, C, and C1 of 510) mapped to the audio signal corresponding to a channel (e.g., an audio signal 'C' corresponding to a center channel) is included in the additional information.

By using the 3D information of an audio signal, a plurality of depth values are applied to the audio signal, and upon reproduction of the audio signal, the user may feel a stereoscopic effect as if a sound source is located close to or remote from the user.

Figure 6:
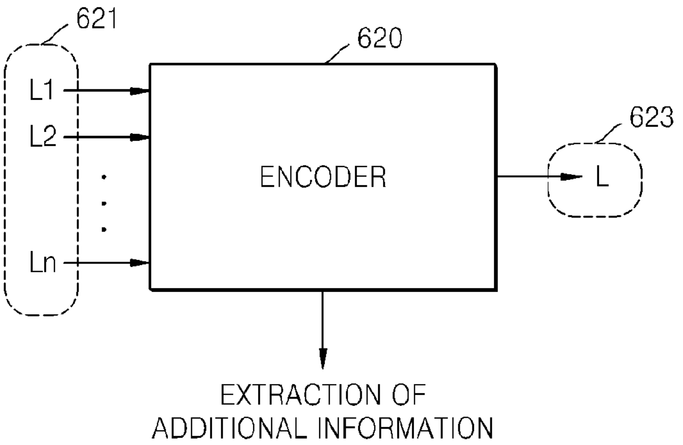
FIG. 6 is another diagram for describing additional information for 3D reproduction of audio signals according to an exemplary embodiment.

FIG. 6 is another diagram for describing additional information for 3D reproduction of audio signals according to an exemplary embodiment.

More specifically, the AC-3 standard does not apply a plurality of depth values to an audio signal. Thus, an encoder 620 outputs audio signals having a single depth value L 623 even if an audio signal having a plurality of depth values L1, L2, . . . , Ln 621 is input through a channel. The encoding apparatus 100 extracts a transformation equation or matrix, or parameter values applied to generate the single depth value 623 from the plurality of depth values 621, as the additional information.

More specifically, 3D information of the audio signal includes at least one of 3D information corresponding to each audio channel included in a bitstream ('first 3D information of audio signal') and reconstruction information of 3D information for generating the 3D information to fit an expanded channel number ('second 3D information of audio signal').

Herein, the first 3D information of audio signal is information used for three-dimensionally reproducing input audio signals if the number of channels of the input audio signals is less than a channel number permitted by a predetermined standard. More specifically, the first 3D information of audio signal includes at least one of a depth map of video data, a plurality of depth values mapped to a single audio signal, and depth value reconstruction information for generating the plurality of depth values mapped to the audio signal.

The depth map of the video data is information including depth values corresponding to video. When the 3D information of audio signal is not directly provided, the depth values of the audio signal may be calculated based on the depth map of the video data.

The second 3D information of audio signal is information used for three-dimensionally reproducing audio signals having an expanded channel number if the number of channels of the input audio signals exceeds a channel number permitted by a predetermined standard. That is, when audio signals corresponding to N channels, which have a single depth value, are reconstructed into M channels having a plurality of depth values, information for generating a plurality of depth values mapped to the respective M channels is the second 3D information of audio signal.

Referring back to FIG. 2, in operation 220, at least one audio signal is encoded according to a predetermined standard. More specifically, if a channel number corresponding to input audio signals exceeds a channel number permitted by the predetermined standard, the input audio signals are down-mixed.

For example, the encoding apparatus 100 according to the AC-3 standard encodes the input audio signals to fit 5.1 channels. More specifically, if the input audio signals are audio signals corresponding to 10.2 channels, the input audio signals are down-mixed to 5.1 channels. In this case, additional information may include reconstruction information for expanding 5.1 channels to 10.2 channels. Operation 220 may be performed by the encoder 120 under control of the first control unit 130.

The encoded audio signal generated in operation 220 is formatted to a bitstream including synchronization information SI, bitstream information BSI, at least one audio block AB, and auxiliary data, in operation 230. Operation 230 may be performed by the formatter 125 under control of the first control unit 130. The bitstream generated in operation 230 will be described below with reference to FIGS. 7, 8A, and 8B.

Figure 7:
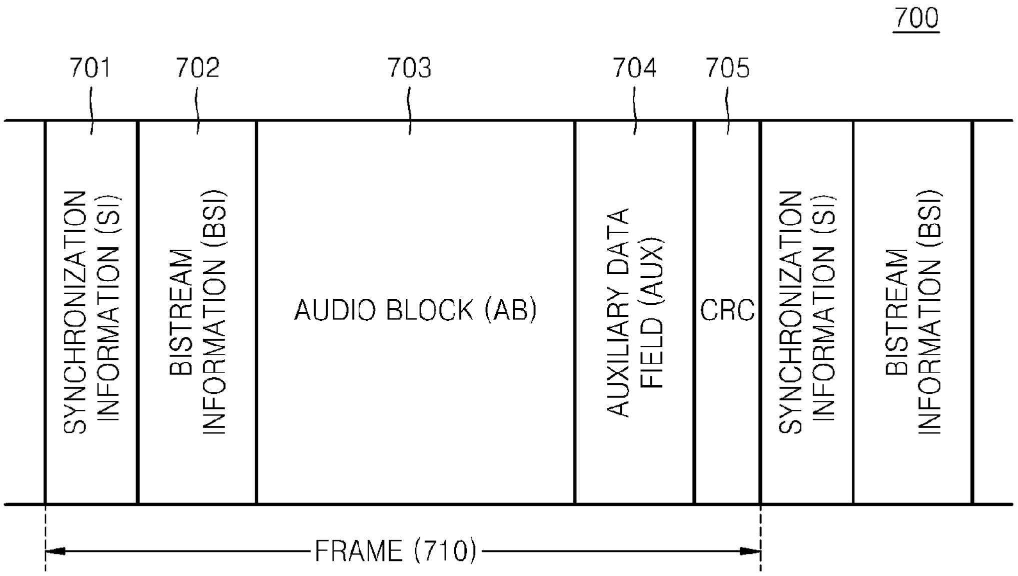
FIG. 7 is a diagram illustrating a bitstream according to an exemplary embodiment.

FIG. 7 is a diagram illustrating a bitstream according to an exemplary embodiment.

Referring to FIG. 7, a bitstream 700 generated in operation 230 (see FIG. 2) includes a plurality of successive frames 710. Each frame 710 may include synchronization information SI 701, bitstream information BSI 702, an audio block region AB 703, and auxiliary data AUX 704. Herein, the audio block region AB 703 includes at least one audio block (not shown). The frame 710 may further include a cyclic redundancy check (CRC) field 405 or an error detection code (not shown).

The synchronization information SI 701 is intended to indicate a start of the frame 700 and has a fixed number of bits. The bitstream information BSI 702 includes information used for reproducing a substantial audio signal or information used for decoding the substantial audio signal. The audio block region AB 703 is a region in which the substantial audio signal is loaded.

The auxiliary data AUX 704 may include data other than the substantial audio signal in the frame 710. The auxiliary data AUX 704 may also exist to perform buffer control.

Figure 8A:
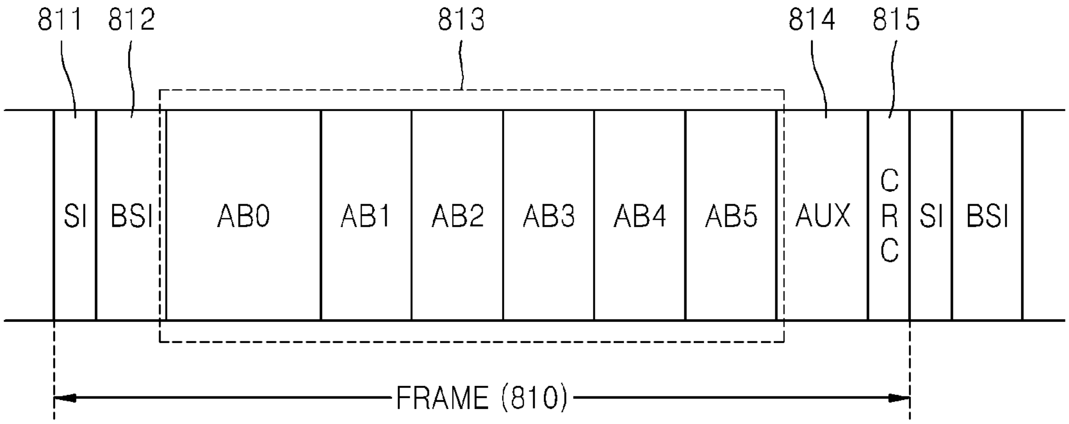
FIGS. 8A and 8B are diagrams illustrating a bitstream complying with an AC-3 standard and a bitstream complying with an Enhanced AC-3 standard.
Figure 8B:
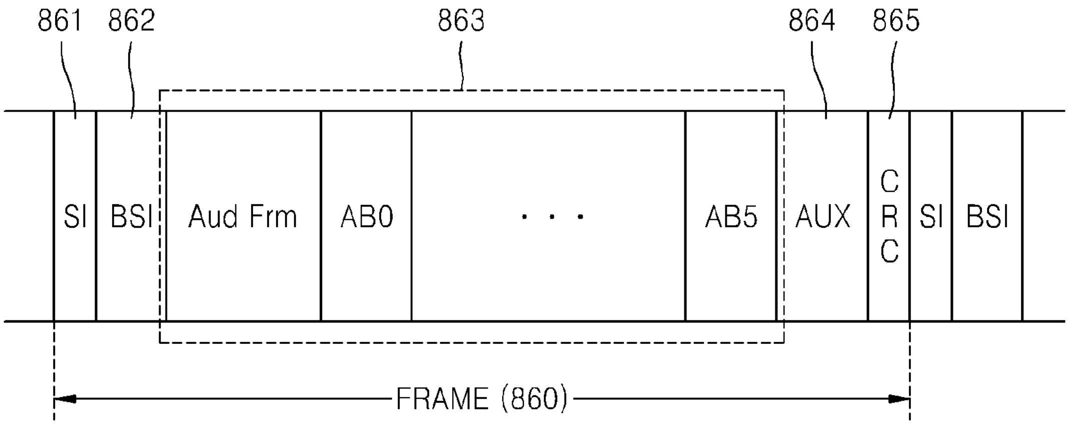

FIGS. 8A and 8B are diagrams illustrating a bitstream according to the AC-3 standard (i.e., an AC-3 bitstream) and a bitstream according to the Enhanced AC-3 standard (i.e., an Enhanced AC-3 bitstream).

FIG. 8A is a diagram illustrating the AC-3 bitstream. In FIG. 8A, a frame 810, an information SI 811, bitstream information BSI 812, an audio block region AB 813, auxiliary data AUX 814, and a cyclic redundancy check CRC 815 are the same as or similar to the frame 710, the synchronization information SI 701, the bitstream information BSI 702, the audio block region AB 703, the auxiliary data AUX 704, and the cyclic redundancy check CRC 705 shown in FIG. 7, and thus will not be described repetitively.

In FIG. 8A, according to the AC-3 standard, the audio block region AB 813 includes 6 audio blocks AB0, AB1, AB2, AB3, AB4, and AB5, each of which has a variable size and carries a substantial audio signal.

More specifically, substantial audio signals having a maximum of 5.1 channels according to the AC-3 standard are transmitted through the audio blocks AB0, AB1, AB2, AB3, AB4, and AB5 to a decoding apparatus.

According to the AC-3 standard, a size occupied by the synchronization information SI, the bitstream information BSI, and the first and second audio blocks AB0 and AB1 should not exceed ⅝ of the total size of the frame 810. In addition, a size occupied by a mantissa region of the last audio block AB5 and the auxiliary data field AUX should not exceed ⅝ of the total size of the frame 810.

FIG. 8B is a diagram illustrating an Enhanced AC-3 bitstream. In FIG. 8B, a frame 860, an information SI 861, bitstream information BSI 862, an audio block region AB 863, auxiliary data AUX 864, and a cyclic redundancy check CRC 865 are the same as or similar to the frame 710, the synchronization information SI 701, the bitstream information BSI 702, the audio block region AB 703, the auxiliary data AUX 704, and the cyclic redundancy check CRC 705 shown in FIG. 7, and thus will not be described repetitively.

In FIG. 8B, according to the Enhanced AC-3 standard, the audio block region AB 863 includes an audio frame AudFrm and n audio blocks. According to the Enhanced AC-3 standard, n may be 1, 2, 3, or 6. In FIG. 8B, n is assumed to be 6. Each of the audio blocks AB0 through AB5 has a variable size and carries a substantial audio signal.

More specifically, substantial audio signals having a maximum of 13.1 channels according to the Enhanced AC-3 standard are transmitted through the audio blocks AB0 through AB5 to a decoding apparatus.

Figure 9:
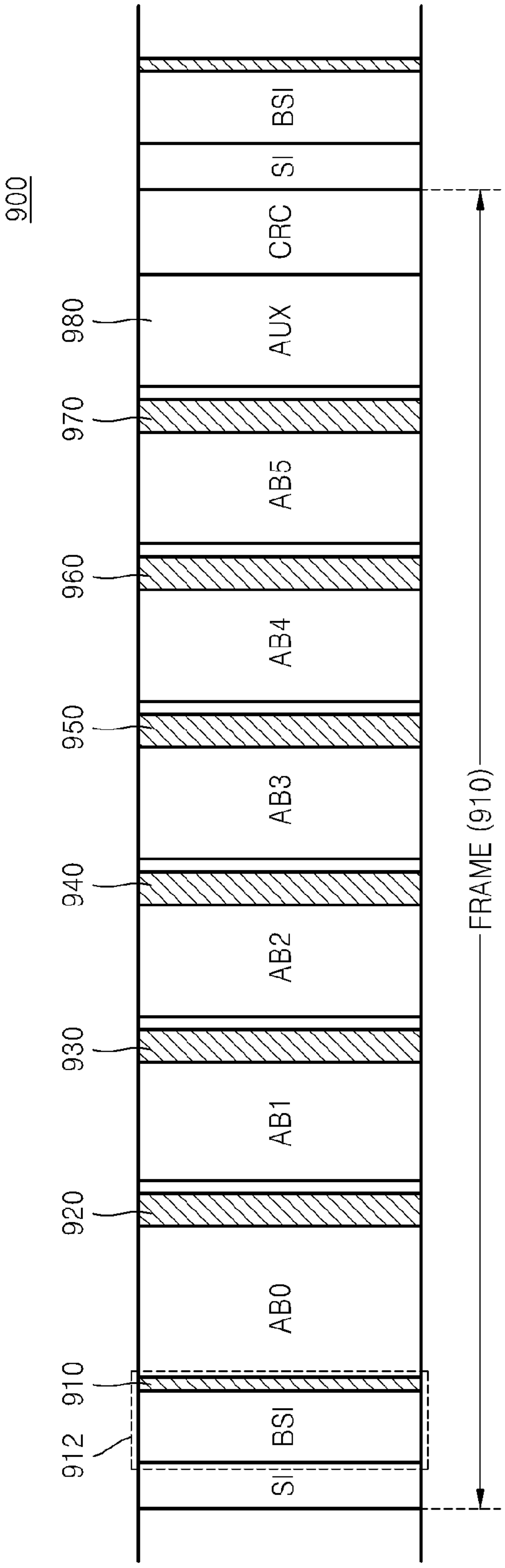
FIG. 9 is a diagram illustrating a bitstream stored in an information storage medium according to an exemplary embodiment.

FIG. 9 is a diagram illustrating a bitstream stored in an information storage medium according to an exemplary embodiment.

A bitstream 900 shown in FIG. 9 is assumed to be a bitstream complying with the AC-3 standard. The bitstream 900 corresponds to the bitstream shown in FIG. 8A. With reference to FIGS. 2 and 9, operations 240 and 250 of FIG. 2 will be described.

In operation 240, the additional information extracted in operation 210 is inserted into at least one of additional bitstream information (addbsi) 910 included in the bitstream information BSI 912, skip fields (skipfld) 920, 930, 940, 950, 960, and 970 included in audio blocks AB0, AB1, AB2, AB3, AB4, and/or AB5, and auxiliary data bits (Auxbits) 980 included in the auxiliary data field AUX 980.

When the additional information is inserted into the audio blocks AB0, AB1, AB2, AB3, AB4, and/or AB5, the additional information may be inserted into at least one skip field corresponding to each audio block.

The amount of additional information which can be inserted into the additional bitstream information 910 of the bitstream information BSI 912 may be a maximum of 64 bytes, and the bitstream 900 may be processed at 14.7 kbps (kilo bits per sec.) at an operating frequency of 44.1 kHz.

The amount of additional information which can be inserted into the skip fields 920, 930, 940, 950, 960, and 970 included in the audio blocks AB0, AB1, AB2, AB3, AB4, and/or AB5 may be 512 bytes per skip field corresponding to an audio block, and the bitstream 900 may be recorded and read at 117.6 kbps at an operating frequency of 44.1 kHz.

In operation 250, the aforementioned first information is inserted into at least one of the additional bitstream information (addbsi) 910, the skip fields (skipfld) 920, 930, 940, 950, 960, and 970, and the auxiliary data bits (Auxbits) 980. Operation 250 will be later described in detail with reference to FIGS. 12 through 14.

Operations 240 and 250 may be performed under control of the first control unit 130 (see FIG. 1).

The signal processing method 200 may further include operation 260 of transmitting the bitstream 900 into which the additional information and the first information are inserted to a decoding apparatus.

Figure 10:
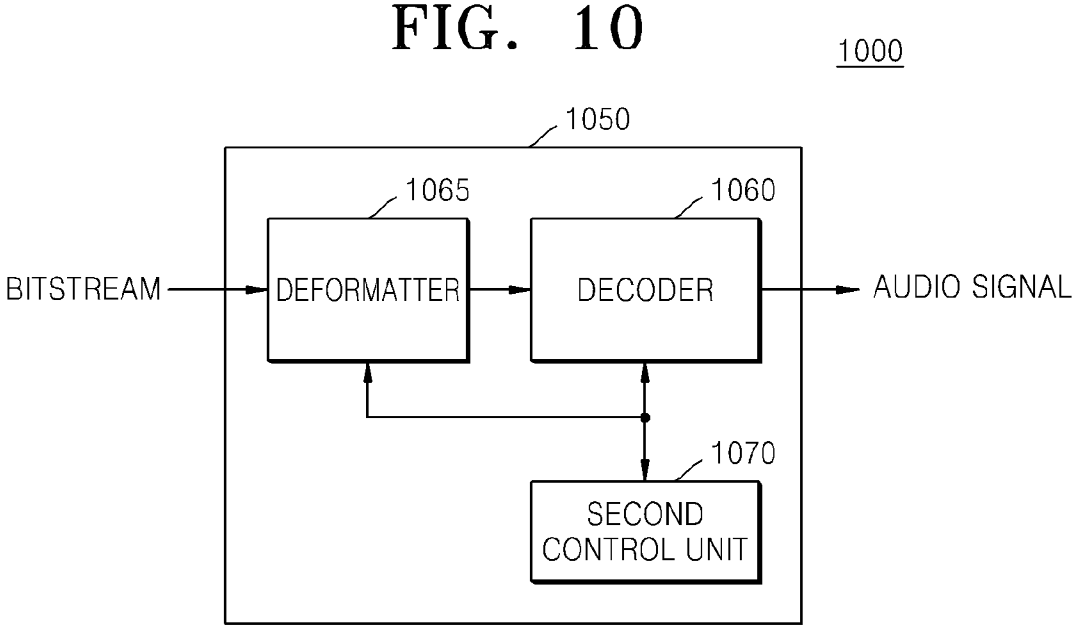
FIG. 10 is a block diagram of a decoding apparatus according to an exemplary embodiment.

FIG. 10 is a block diagram of a decoding apparatus 1000 according to an exemplary embodiment.

Referring to FIG. 10, a decoding apparatus 1000 receives the bitstream 900 generated and transmitted from the encoding apparatus 100 shown in FIG. 1, reconstructs the bitstream 900 into an original audio signal, and outputs the original audio signal. That is, the decoding apparatus 1000 generates the reconstructed audio signal by performing AC-3 decoding.

Operations of the decoding apparatus 1000 according to an exemplary embodiment are the same as or similar to operations of a signal processing method 1100 according to another exemplary embodiment which will be described below with reference to FIGS. 11 through 14. Therefore, the decoding apparatus 1000 and the signal processing method 1100 according to one or more exemplary embodiments will be described with reference to FIGS. 10 through 14.

Referring to FIG. 10, the decoding apparatus 1000 may include a decoder 1060, a deformatter 1065, and a second control unit 1070.

Figure 11:
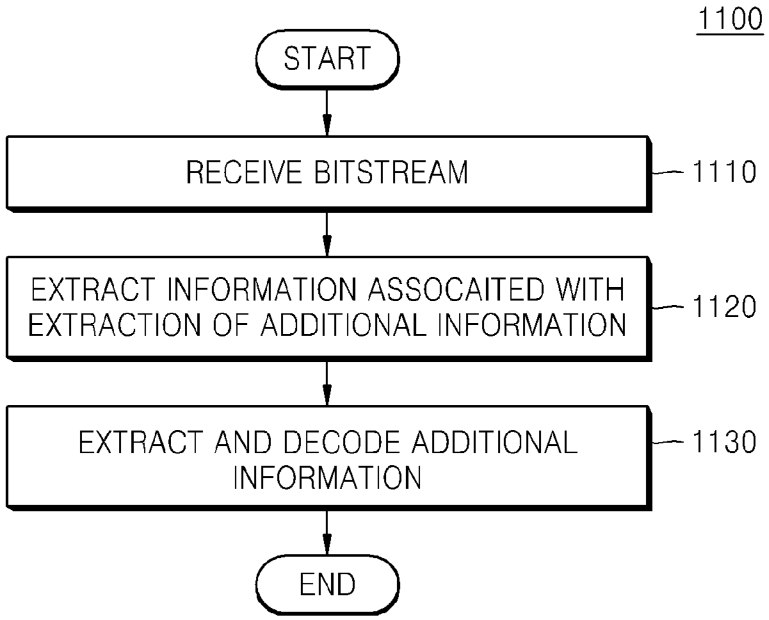
FIG. 11 is a flowchart illustrating a signal processing method according to another exemplary embodiment.

FIG. 11 is a flowchart illustrating the signal processing method 1100 according to another exemplary embodiment. A bitstream including additional information and first information processed in the signal processing method 1100 shown in FIG. 11 is the same as or similar to the bitstream described above with reference to FIGS. 1 through 9, and thus will not be described repetitively.

The deformatter 1065 receives a bitstream including synchronization information, bitstream information, an audio block, and auxiliary data from the encoding apparatus 100 in operation 1110. The deformatter 1065 deformats the received bitstream. More specifically, the deformatter 1065 transforms the received bitstream such that the bitstream has a form which the bitstream had before passing through the formatter 125.

The second control unit 1070 extracts the first information included in at least one of additional bitstream information (addbsi), skip fields (skipfld), and auxiliary data bits (Auxbits) in operation 1120. Herein, the first information is information associated with extraction of the additional information.

In operation 1130, the second control unit 1070 extracts the additional information from at least one of the additional bitstream information (addbsi), the skip fields (skipfld), and the auxiliary data bits (Auxbits) included in bitstream information by using the first information extracted in operation 1120, and decodes the extracted additional information.

More specifically, the decoder 1060 decodes the deformatted bitstream according to a predetermined standard. To this end, the second control unit 1070 may determine whether there is an expanded channel based on the extracted additional information. If there is an expanded channel, the second control unit 1070 controls the bitstream deformatted by the deformatter 1065 to be decoded according to the number of expanded channels. In addition, the second control unit 1070 controls the decoder 1060 to decode the bitstream by using the extracted additional information.

Herein, whether there is an expanded channel may be determined by checking if reconstruction information of multi-channels is included in the additional information.

For example, if the bitstream input to the decoding apparatus 1000 includes 5.1 channels according to the AC-3 standard, the additional information may include the reconstruction information of the multi-channels for expanding the bitstream including the 5.1 channels to audio signals including 10.2 channels. In this case, the second control unit 1070 extracts the additional information including the reconstruction information of the multi-channels and controls the decoder 1060 to output the bitstream including the 5.1 channels as the audio signals including the 10.2 channels by using the reconstruction information of the multi-channels.

When the extracted additional information includes the 3D information of audio signal, the second control unit 1070 may control the decoder 1060 to three-dimensionally reproduce the audio signal by using the 3D information of the audio signal. More specifically, the decoder 1060 decodes the bitstream under control of the second control unit 1070 such that an audio signal having at least one predetermined depth is output.

When the extracted additional information includes both the reconstruction information of the multi-channels and the 3D information of the audio signal, the second control unit 1070 may control the decoder 1060 to decode the bitstream to have a channel number larger than a channel number permitted by the predetermined standard and output each decoded audio signal having a predetermined depth.

The signal processing method 1100 may be performed successively from the signal processing method 200 described in FIG. 2.

Operations 1120 and 1130 of the signal processing method 1100 will be described in detail with reference to FIGS. 12 through 14.

Figure 12:
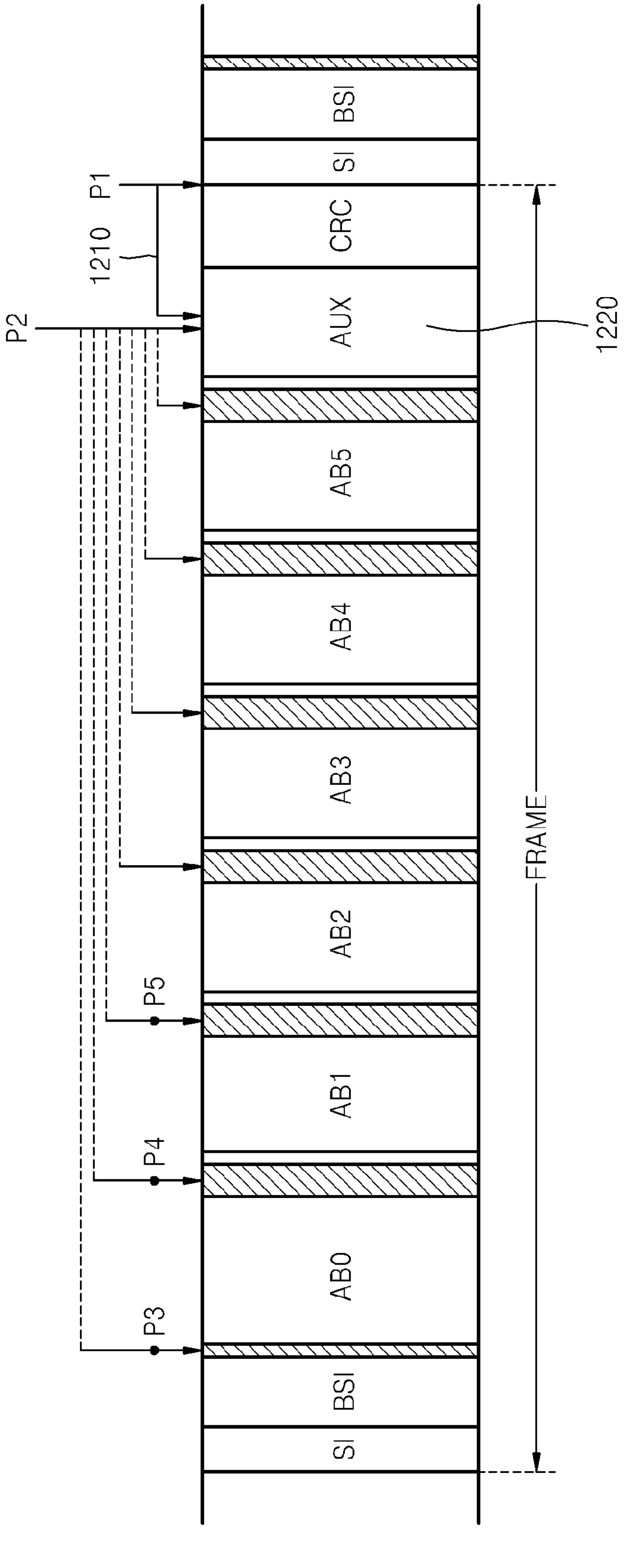
FIG. 12 is a diagram for describing an operation of extracting first information and an operation of extracting and decoding additional information shown in FIG. 11.

FIG. 12 is a diagram for describing operations 1120 and 1130 of FIG. 11.

The first information, which is information associated with extraction of the additional information, may be included in auxiliary data bits Auxbits of an auxiliary data field AUX 1220.

The second control unit 1070 detects synchronization information SI and starts reading the bitstream in a backward direction of the bitstream (a direction indicated by 1210) from a start point P1 of the synchronization information SI. Since a region occupied by a cyclic redundancy check CRC is relatively small, the second control unit 1070 may rapidly access a point P2 at which the auxiliary data bits Auxbits of the auxiliary data field AUX 1220 are stored. The second control unit 1070 reads the first information stored in a region of the auxiliary data bits Auxbits.

The first information includes at least one of information indicating whether the additional information is included, position information of the additional information, and length information of the additional information.

When the first information includes the information indicating whether the additional information is included, the second control unit 1070 may rapidly check if the additional information is included, without reading, parsing, and decoding the entire bitstream.

When the first information includes the position information of the additional information and the length information of the additional information, a region in which the additional information is recorded can be directly accessed by reading the first information. Consequently, without a need to read the entire bitstream, parse each block, and search for the additional information, the additional information may be rapidly and easily extracted.

For example, when the position information of the additional information included in the first information indicates a point P3, the second control unit 1070 moves to the point P3 to extract the additional information by using the length information of the additional information. When the position information of the additional information included in the first information indicates at least one of points P4 and P5, the second control unit 1070 moves to a corresponding point to extract the additional information by using the length information of the additional information.

Figure 13:
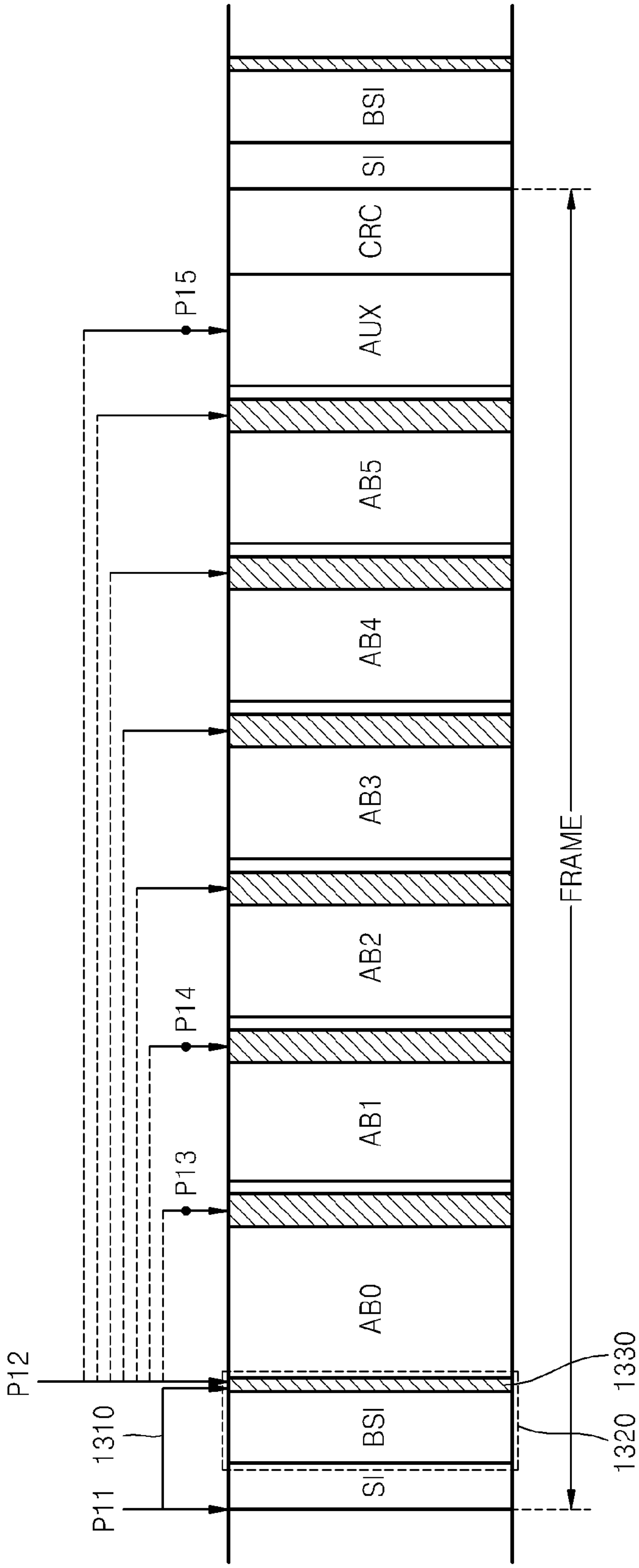
FIG. 13 is another diagram for describing an operation of extracting first information and an operation of extracting and decoding additional information shown in FIG. 11.

FIG. 13 is another diagram for describing operations 1120 and 1130 of FIG. 11.

The first information, which is information associated with extraction of the additional information, may be included in additional bitstream information (addbsi) 1330 of bitstream information BSI 1320.

The second control unit 1070 detects synchronization information SI and starts reading the bitstream in a forward direction of the bitstream (a direction indicated by 1310) from a start point P11 of the synchronization information SI. Since the bitstream information BSI 1320 is arranged immediately adjacent to the synchronization information SI, the second control unit 1070 may rapidly access a point P12 at which the additional bitstream information (addbsi) 1330 is stored, and extract the first information therefrom. Consequently, the second control unit 1070 may rapidly and easily extract the additional information by using the extracted first information.

For example, when the position information of the additional information included in the first information indicates at least one of points P13, P14, and P15, the second control unit 1070 moves to a corresponding point to extract the additional information by using the length information of the additional information.

Figure 14:
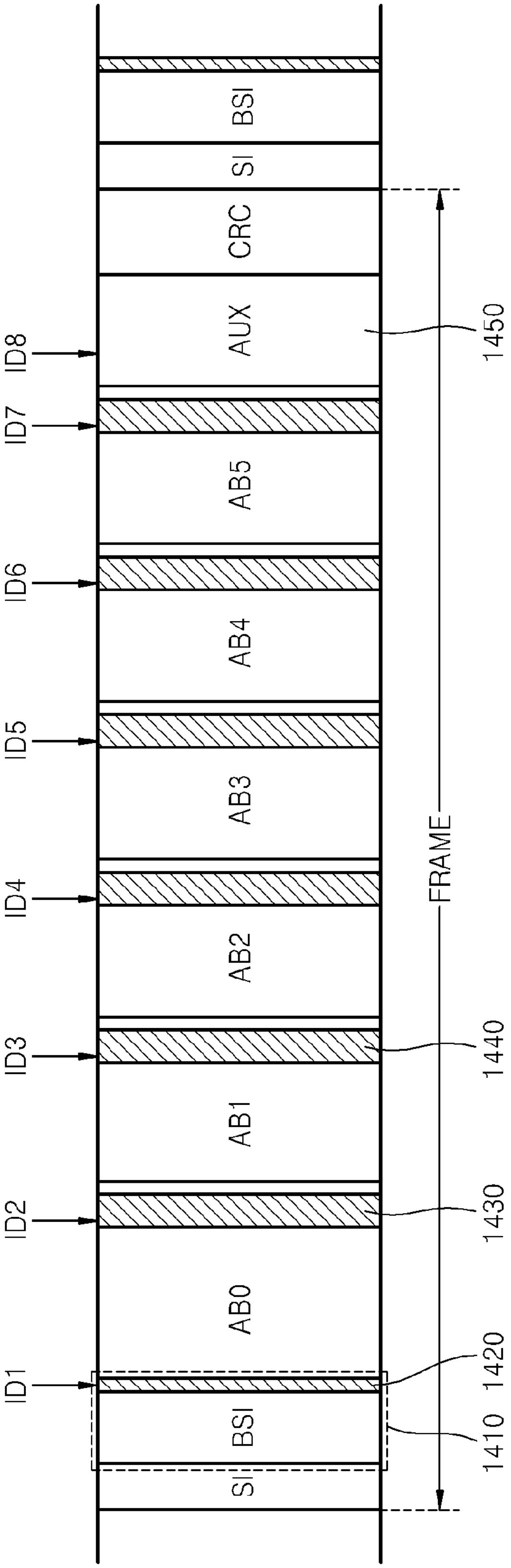
FIG. 14 is another diagram for describing an operation of extracting first information and an operation of extracting and decoding additional information shown in FIG. 11.

FIG. 14 is another diagram for describing operations 1120 and 1130 of FIG. 11.

The first information may be identifiers ID1, ID2, ID3, ID4, ID5, ID6, ID7, and ID8 indicating points at which the additional information is inserted. For example, the identifier may be positioned in a region where the additional information substantially exists. The identifier may be inserted into at least one of a start point and an end point of the region where the additional information is inserted.

The second control unit 1070 may detect the identifier to extract the start point of the additional information. Thus, by reading the bitstream from the point at which the identifier exists, the additional information may be rapidly extracted. For example, when identifiers exist in an additional bitstream region (addbsi) 1440, a first audio block AB0, a second audio block AB1, and auxiliary data bits (Auxbits) 1450, the bitstream may include 4 identifiers ID1, ID2, ID3, and ID8.

As described above, the signal processing method, the encoding apparatus, the decoding apparatus, and the information storage medium according to exemplary embodiments may rapidly extract and decode the additional information, by using information for extracting the additional information, which is inserted into the bitstream. Moreover, by including reconstruction information for channel expansion and 3D information in the additional information, audio signals may be reproduced with an improved stereoscopic effect.

The signal processing method according to one or more exemplary embodiments may be embodied as a computer-readable code or program on a computer-readable recording medium. The computer-readable recording medium may be all kinds of recording devices storing data that is readable by a computer. Examples of the computer-readable recording medium include read-only memory (ROM), random access memory (RAM), CD-ROMs, magnetic tapes, floppy disks, and optical data storage devices. The computer-readable recording medium can also be distributed over a network of coupled computer systems so that the computer-readable code is stored and executed in a decentralized fashion. Moreover, one or more units of the encoding apparatus 100 and the decoding apparatus 1000 can include a processor or microprocessor executing a computer program stored in a computer-readable medium.

While exemplary embodiments have been particularly shown and described above, it will be understood by those of ordinary skill in the art that various changes in form and details may be made therein without departing from the spirit and scope of the present inventive concept as defined by the following claims. Accordingly, the scope of the present inventive concept is defined not by the disclosed exemplary embodiments, and will be interpreted as encompassing various embodiments in the equivalent scope to the appended claims.

What is claimed is:

1. A method for processing a bitstream comprising synchronization information, bitstream information, at least one audio block including at least one audio signal, and an auxiliary data field, the method comprising:

receiving the bitstream in which at least one of additional bitstream information included in the bitstream information, a skip field included in the at least one audio block, and auxiliary data bits included in the auxiliary data field comprises additional information;

extracting first information which is information associated with extraction of the additional information, and is included in at least one of the additional bitstream information, the skip field, and the auxiliary data bits; and extracting and decoding the additional information by using the extracted first information, wherein the additional information comprises three-dimensional (3D) information of the at least one audio signal.

2. The method of claim 1, wherein the additional information further comprises reconstruction information of multi-channels for expanding an audio channel number to more than a number of channels included in the bitstream.

3. The method of claim 2, wherein the 3D information of the at least one audio signal comprises at least one of 3D information corresponding to each of the channels included in the bitstream and reconstruction information of the 3D information for generating the 3D information to fit the expanded number of channels.

4. The method of claim 3, wherein the 3D information corresponding to each of the channels included in the bitstream comprises at least one of a depth map of video data, a plurality of depth values mapped to the at least one audio signal, and depth value reconstruction information for generating the plurality of depth values mapped to the at least one audio signal.

5. The method of claim 4, wherein the first information further comprises information indicating a type of the additional information.

6. The method of claim 2, further comprising:

generating, by an encoding apparatus, the additional information;

encoding, by the encoding apparatus, the at least one audio signal according to a predetermined standard;

formatting, by the encoding apparatus, the encoded at least one audio signal to the bitstream;

inserting, by the encoding apparatus, the additional information into the at least one of the additional bitstream information, the skip field, and the auxiliary data bits; and inserting, by the encoding apparatus, the first information into the at least one of the additional bitstream information, the skip field, and the auxiliary data bits.

7. The method of claim 6, further comprising transmitting the bitstream including the additional information and the first information to a decoding apparatus.

8. The method of claim 1, wherein the first information comprises at least one of information indicating whether the additional information is included, position information of the additional information, and length information of the additional information.

9. The method of claim 8, wherein the extracting of the first information comprises:

detecting the synchronization information;

reading the bitstream in a backward direction from a location of the detected synchronization information; and according to a result of the reading, extracting the first information included in the auxiliary data bits.

10. The method of claim 8, wherein the extracting of the first information comprises:

detecting the synchronization information;

reading the bitstream in a forward direction from a location of the detected synchronization information; and according to a result of the reading, extracting the first information included in the additional bitstream information.

11. The method of claim 1, wherein the extracting of the first information comprises extracting, as the first information, an identifier indicating a point in the bitstream at which the additional information is inserted.

12. A non-transitory information storage medium having recorded therein a bitstream comprising:

synchronization information;

bitstream information comprising additional bitstream information;

at least one audio block comprising a skip field and at least one audio signal; and an auxiliary data field comprising auxiliary data bits, wherein at least one of the additional bitstream information, the skip field, and the auxiliary data bits comprises additional information for executing, by a decoding apparatus, at least one of audio channel number expansion and three-dimensional (3D) reproduction of the at least one audio signal, wherein at least one of the additional bitstream information, the skip field, and the auxiliary data bits comprises first information which is information associated with extraction of the additional information, and wherein the additional information comprises 3D information of the at least one audio signal.

13. The non-transitory information storage medium of claim 12, wherein the additional information further comprises reconstruction information of multi-channels for expanding an audio channel number to more than a number of channels included in the bitstream.

14. The non-transitory information storage medium of claim 13, wherein:

the first information is included in at least one of the additional bitstream information and the auxiliary data bits; and the first information comprises at least one of information indicating whether the additional information is included, position information of the additional information, and length information of the additional information.

15. The non-transitory information storage medium of claim 13, wherein:

the first information is included at least one of the additional bitstream information, the skip field, and the auxiliary data bits; and the first information is an identifier indicating a point in the bitstream at which the additional information is inserted.

16. The non-transitory information storage medium of claim 13, wherein the 3D information of the at least one audio signal comprises at least one of 3D information corresponding to each of the channels included in the bitstream and reconstruction information of the 3D information for generating the 3D information to fit the expanded number of channels.

17. An encoding apparatus comprising:

an encoder which encodes at least one audio signal according to a predetermined standard;

a formatter which formats the encoded at least one audio signal into a bitstream comprising synchronization information, bitstream information, at least one audio block, and an auxiliary data field; and a control unit which inserts additional information into at least one of additional bitstream information included in the bitstream information, a skip field included in the at least one audio block, and auxiliary data bits included in the auxiliary data field, and which inserts first information, which is information associated with extraction of the additional information, into at least one of the additional bitstream information, the skip field, and the auxiliary data bits, wherein the additional information comprises 3D information of the at least one audio signal.

18. The encoding apparatus of claim 17, wherein the predetermined standard is an Audio Coding (AC)-3 standard or an Enhanced AC-3 standard.

19. A decoding apparatus comprising:

a deformatter which deformats a bitstream comprising synchronization information, bitstream information, at least one audio block including at least one audio signal, and an auxiliary data field;

a control unit which extracts first information, which is information associated with extraction of additional information and included in at least one of additional bitstream information included in the bitstream information, a skip field included in the at least one audio block, and auxiliary data bits included in the auxiliary data field, and which extracts the additional information from at least one of the additional bitstream information, the skip field, and the auxiliary data bits by using the extracted first information; and a decoder which decodes the extracted additional information, wherein the additional information comprises 3D information of the at least one audio signal.

20. The decoding apparatus of claim 19, wherein the first information comprises at least one of information indicating whether the additional information is included, position information of the additional information, and length information of the additional information.

21. The decoding apparatus of claim 20, wherein the control unit detects the synchronization information, reads the bitstream in a backward direction from a location of the detected synchronization information, and extracts the first information included in the auxiliary data bits.

22. The decoding apparatus of claim 20, wherein the control unit detects the synchronization information, reads the bitstream in a forward direction from a location of the detected synchronization information, and extracts the first information included in the additional bitstream information.

23. The decoding apparatus of claim 20, wherein the control unit extracts, as the first information, an identifier indicating a point in the bitstream at which the additional information is inserted.

24. A method of processing a bitstream, the method comprising:

generating additional information;

encoding at least one audio signal according to a predetermined standard;

formatting the encoded at least one audio signal to the bitstream, the bitstream comprising bitstream information, at least one audio block, and an auxiliary data field;

inserting the additional information into at least one of additional bitstream information included in bitstream information, a skip field included in the at least one audio block, and auxiliary data bits included in the auxiliary data field; and inserting first information into at least one of the additional bitstream information, the skip field, and the auxiliary data bits, wherein the first information is information used to extract the additional information from the bitstream, and wherein the additional information comprises 3D information of the at least one audio signal.

25. A non-transitory computer readable recording medium having recorded thereon a program executable by a computer for performing the method of claim 1.

26. A non-transitory computer readable recording medium having recorded thereon a program executable by a computer for performing the method of claim 24.

27. A method for processing a bitstream comprising synchronization information, bitstream information, at least one audio block including at least one audio signal, and an auxiliary data field, the method comprising:

receiving the bitstream in which at least one of additional bitstream information included in the bitstream information, a skip field included in the at least one audio block, and auxiliary data bits included in the auxiliary data field comprises additional information;

extracting first information which is information associated with extraction of the additional information, and is included in at least one of the additional bitstream information, the skip field, and the auxiliary data bits; and extracting and decoding the additional information by using the extracted first information, wherein the additional information comprises at least one of reconstruction information of multi-channels for expanding an audio channel number to more than a number of channels included in the bitstream, and three-dimensional (3D) information of the at least one audio signal, and wherein the method further comprises:

generating, by an encoding apparatus, the additional information;

encoding, by the encoding apparatus, the at least one audio signal according to a predetermined standard;

formatting, by the encoding apparatus, the encoded at least one audio signal to the bitstream;

inserting, by the encoding apparatus, the additional information into the at least one of the additional bitstream information, the skip field, and the auxiliary data bits; and inserting, by the encoding apparatus, the first information into the at least one of the additional bitstream information, the skip field, and the auxiliary data bits.

28. A method for processing a bitstream comprising synchronization information, bitstream information, at least one audio block including at least one audio signal, and an auxiliary data field, the method comprising:

receiving the bitstream in which at least one of additional bitstream information included in the bitstream information, a skip field included in the at least one audio block, and auxiliary data bits included in the auxiliary data field comprises additional information;

extracting first information which is information associated with extraction of the additional information, and is included in at least one of the additional bitstream information, the skip field, and the auxiliary data bits; and extracting and decoding the additional information by using the extracted first information, and wherein the additional information comprises reconstruction information of multi-channels for expanding an audio channel number included in the bitstream to more than a number of channels permitted by a predetermined standard.

* * * * *